United States Patent
Kitamura et al.

[11] Patent Number: 6,005,246
[45] Date of Patent: Dec. 21, 1999

[54] SCANNING PROBE MICROSCOPE

[75] Inventors: Shinichi Kitamura, Saitama; Takashi Sueyoshi, Tokyo, both of Japan

[73] Assignee: JEOL Ltd., Tokyo, Japan

[21] Appl. No.: 09/111,971

[22] Filed: Jul. 8, 1998

[30] Foreign Application Priority Data

Jul. 8, 1997 [JP] Japan .................................. 9-182305

[51] Int. Cl.[6] ................................................ G01B 5/28
[52] U.S. Cl. ........................................... 250/306; 73/105
[58] Field of Search .................................. 250/306, 307; 73/105

[56] References Cited

U.S. PATENT DOCUMENTS 5,267,471  12/1993  Abraham et al. ............................ 73/105
5,631,410   5/1997  Kitamura .................................... 73/105

OTHER PUBLICATIONS

"Kelvin Probe Force Microscopy", Nonnenmacher, O'Boyle and Wickramasinghe, *Appl. Phys. Lett.*, vol. 58, No. 25, Jun. 24, 1991, pp. 2921–2923.

*Primary Examiner*—Kiet T. Nguyen
*Attorney, Agent, or Firm*—Webb Ziesenheim Logsdon Orkin & Hanson, P.C.

[57] ABSTRACT

There is disclosed a scanning probe microscope capable of producing a topographic image at a high resolution with a cantilever of a large spring constant and, at the same time, a surface potential image at a high resolution. This microscope can take the form of an atomic force microscope that detects the surface potential of a sample, using a force gradient acting between the probe tip and the sample. The gradient is represented by the output from a frequency-to-voltage converter.

5 Claims, 5 Drawing Sheets

SCANNING PROBE MICROSCOPE

FIELD OF THE INVENTION

The present invention relates to a scanning probe microscope, typified by an atomic force microscope (AFM), that receives a force from a sample and produces images of both the topography of the surface of the sample and the surface potential.

BACKGROUND OF THE INVENTION

Scanning probe microscopy (SPM) has been heretofore developed that measures a physical force produced between a probe tip and a sample to image both the topography of the sample surface and the potential on the sample surface. FIG. 4 schematically shows an example of an atomic force microscope relying on Kelvin probe force microscopy that is one example of such scanning probe microscopy. A cantilever 1 has electrical conductivity and elasticity and is coated with a metal, such as gold. A probe tip 2 is attached to the front end of the cantilever 1. A sample to be investigated is indicated by numeral 3. A piezoelectric scanning device 4 controls the position of the sample 3 on the X-axis (horizontal direction as viewed in FIG. 4), on the Y-axis (a direction perpendicular to the plane of the sheet) and on the Z-axis (vertical direction as viewed in FIG. 4). A piezoelectric device 5 for applying vibrations is mounted at the rear end of the cantilever 1 that is supported. A light source 6 consists of a laser, for example. The instrument further includes a light detector 7, also known as an optical detector, and a preamplifier 8. An oscillator 9 supplies an output signal having an adjusted amplitude to the piezoelectric device 5 to produce vibrations. A lock-in amplifier or RMS-DC amplifier 10 receives the output signal from the oscillator 9 and selects signals corresponding to amplitude variations synchronized to the output signal from the oscillator 9 to produce a topographic image. The instrument further includes an error amplifier 11, a filter 12, a z-motion piezoelectric drive power supply 13, a first lock-in amplifier 14 for imaging surface potentials, a second lock-in amplifier 15 for imaging a gradient of capacitance between probe tip 2 and sample 3, an oscillator 16 for supplying a reference signal consisting of an alternating voltage of a given frequency ω to the first and second lock-in amplifiers 14 and 15, respectively, the amplitude of the reference signal being adjusted to a desired level, an error amplifier 17, and an accumulator 18 for applying a potential representative of the sum of the output signal from the oscillator 16 and the output DC voltage Vdc from the error amplifier 17 to the cantilever 1. The error amplifier 17 makes a zero adjustment, i.e., produces an output signal Vdc such that the input from the first lock-in amplifier 14 becomes zero. The error amplifier 17 includes a filter or other element used to feed the DC voltage Vdc back to the cantilever 1.

This atomic force microscope is a noncontact atomic force microscope in which the probe tip 2 and the sample 3 are opposite to each other and are not in contact with each other. Laser light or other light is emitted from the light source 6 and focused onto the rear surface of the cantilever 1. Light reflected from the rear surface impinges on the light detector 7. The light source 6, the cantilever 1 and the light detector 7 together form an optical lever-type detection system for detecting deflections of the cantilever 1. An atomic force exerted between the tip 2 and the sample 3 deflects the cantilever 1, varying the reflection angle. This, in turn, changes the position on the light detector 7 as the light hits the detector 7 spaced from the cantilever 1. The deflection of the cantilever 1 is detected from the change in this position.

In the atomic force microscope constructed in this way, the output signal from the oscillator 9 is supplied to the piezoelectric device 5. Thus, the cantilever 1 is vibrated at a frequency approximately equal to its resonance frequency. Under this condition, if the tip 2 is brought to a position spaced several nanometers from the sample 3, a physical force produced between the tip 2 and the sample 3 deflects the cantilever 1. This varies the output from the light detector 7. The varied output signal is amplified to an appropriate amplitude by the preamplifier 8 and supplied to the lock-in amplifier 10 for producing a topographic image. This lock-in amplifier 10 compares the frequency of the output signal from the light detector 7 with the frequency components contained in the output signal from the oscillator 9 and produces a signal proportional to the amplitude of the common frequency component to the error amplifier 11. This amplifier 11 maintains the difference between the output from the lock-in amplifier 10 and a certain voltage set according to a reference voltage V, i.e., the deviation from the resonance frequency. The output signal from the error amplifier 11 is sent to the z-motion piezoelectric drive power supply 13 via the filter 12. This power supply 13 provides feedback control of the piezoelectric scanning device 4 to control the distance between the tip 2 and the sample 3 according to the output signal from the filter 12.

The filter 12 regulates the operation of the feedback circuit as described above. The output signal from the filter 12 creates a topographic image of the surface of the sample 3. A signal representing the topographic image is sent to a display unit (not shown). The tip 2 or the sample 3 is scanned in two dimensions in the X- and Y-directions while maintaining constant the distance between the tip 2 and the sample 3. In this way, a topographic image of the surface of the sample 3 is displayed on the display unit.

The output from the light detector 7 is applied via the preamplifier 8 to the first lock-in amplifier 14 for imaging the surface potential of the sample 3 and to the second lock-in amplifier 15. These lock-in amplifiers 14 and 15 are supplied with the reference signal consisting of an alternating voltage of the given frequency ω from the oscillator 16. The first lock-in amplifier 14 detects a signal corresponding to the amplitude of the same period (i.e., ω component) as the given frequency ω of the reference signal. The second lock-in amplifier 15 detects signals corresponding to twice the period (i.e., 2ω component) of the frequency ω of the reference signal.

The ω component detected by the first lock-in amplifier 14 is sent to the error amplifier 17, which produces the DC voltage Vdc to reduce the ω component down to zero, i.e., makes a zero adjustment. The DC output voltage from the amplifier 17 is fed to the accumulator 18. This accumulator 18 is also supplied with the AC output signal from the oscillator 16 having the same frequency ω as the reference signal, the amplitude of the AC output being adjusted to a given level by an amplitude adjuster incorporated in the oscillator 16. The accumulator 18 produces the sum of the AC voltage of frequency ω from the oscillator 16 and the DC voltage Vdc from the error amplifier 17 to the cantilever 1, thus providing feedback of the voltage.

Application of the AC voltage to the cantilever 1 produces an electrostatic force between the sample 3 and the tip 2 at the front end of the cantilever 1. The sample 3 is at ground potential. The resonance frequency of the cantilever 1 is shifted at the period of the applied AC voltage. The period of this shift is the ω component. If the surface potential of the sample 3 and the potential at the front end of the tip 2 are the same, only the 2ω component is left. Because the DC voltage Vdc is fed back to the cantilever 1, the surface potential of the sample 3 and the potential at the front end of the tip 2 are kept at the same potential. The DC voltage Vdc from the error amplifier 17 is the surface potential of the sample 3. A surface potential image of the sample 3 is obtained by supplying this DC voltage Vdc to the display device (not shown).

The signal of the 2ω component detected by the second lock-in amplifier 15 contains information associated with the capacitance between the tip 2 and the sample 3.

This signal is imaged on the display device simultaneously with the surface potential.

This example of atomic force microscope uses the so-called Kelvin probe force microscopy (KFM) as a procedure for imaging the surface potential of the sample 3. That is, the electrostatic force is detected directly as a force F, or a deflection of the cantilever 1. The voltage applied to the tip that minimizes the electrostatic force is found. In consequence, the surface potential of the sample 3 with respect to the tip surface is imaged.

FIG. 5 schematically shows an example of an atomic force microscope of the prior art scanning probe microscope using scanning Maxwell stress microscopy (SMM). It is to be noted that like components are indicated by like reference numerals in various figures.

In the instrument shown in FIG. 4, the output signal from the lock-in amplifier 10 is used to maintain constant the distance between the tip 2 and the sample 3. The lock-in amplifier 15 of the microscope shown in FIG. 4 produces a signal of the double period (2ω component). In this embodiment of FIG. 5, the amplitude of this double period (2ω component) is used to control the distance between the tip 2 and the sample 3 such that the amplitude is kept constant.

Specifically, in the atomic force microscope shown in FIG. 5, the output from the second lock-in amplifier 15 is sent to the error amplifier 11. This microscope is similar to the microscope shown in FIG. 4 in other respects.

In the atomic force microscope constructed in this way, the output signal from the error amplifier 11 acts to maintain constant the deviation of the output 2ω from the second lock-in amplifier 15 from the given voltage set according to the reference voltage V, or the resonance frequency. This output from the error amplifier 11 is sent to the z-motion piezoelectric drive power supply 13 via the filter 12. This power supply 13 provides negative feedback of the piezoelectric scanning device 4 to control the distance between the tip 2 and the sample 3 according to the output signal from the filter 12. This example of atomic force microscope is similar to the atomic force microscope shown in FIG. 4 in other operations.

This example of atomic force microscope uses the so-called Kelvin probe force microscopy as a procedure for imaging the surface potential of the sample 3. That is, deflections of the cantilever 1 are detected. The DC voltage applied to the tip that makes zero the vibration component of the cantilever 1 having the same period as the AC voltage applied to the tip 2 is found. In consequence, the surface potential of the sample 3 with respect to the tip surface is imaged. That is, so-called scanning Maxwell stress microscopy (SMM) is employed.

The conventional atomic force microscopes shown in FIGS. 4 and 5 and making use of direct detection of the force F must use the cantilever 1 having a small spring constant to ensure detection of the deflections of the cantilever 1. However, reducing the spring constant of the cantilever 1 renders the cantilever 1 more flexible. This creates the danger of the tip 2 at the front end of the cantilever 1 touching the sample 3. Especially, the instrument shown in FIG. 5 uses the signal of the double period (2ω component) and so the distance between the tip 2 and the sample 3 becomes too small. If the tip 2 comes into contact with the sample 3, the cantilever 1 ceases to vibrate. As a result, the 2ω component becomes zero. This is equivalent to the case where the distance between the tip 2 and the sample 3 is large. Accordingly, the feedback acts in such a direction as to reduce the tip-sample distance further. Consequently, the tip 2 completely collides with the sample 3.

Therefore, it is impossible to make the distance between the tip 2 and the sample 3 very small. In consequence, the resolution of the topographic image produced simultaneously with the surface potential image of the sample 3 cannot be improved.

On the other hand, in the noncontacting atomic force microscopy, a cantilever having a relatively large spring constant has been used as the cantilever 1 in recent years in an ultrahigh vacuum in producing a topographic image of the surface of the sample 3 simultaneously with the surface potential image. This makes it possible to image atoms of the sample 3. Under this condition, if the force F is directly detected as in the prior art technique, the resolution of the surface potential image will deteriorate.

SUMMARY OF THE INVENTION

In view of the foregoing circumstances, the present invention has been made.

It is an object of the present invention to provide a scanning probe microscope which uses a cantilever of a large spring constant or a needle-type scanning probe microscope having a high resonance frequency to produce a topographic image of a sample surface at a high resolution and which can produce a potential image of the sample surface at an improved resolution.

To achieve this object, the present invention provides a scanning probe microscope comprising: a probe tip disposed opposite to a sample to be investigated; a first vibration application means for supporting and vibrating the tip, the first vibration application means and the probe tip constituting a vibration system; a vibration-activating means for causing the first vibration application means to vibrate the vibration system at or near resonance frequency of the vibration system; a frequency-to-voltage converter for converting a change in the vibrational frequency of the tip into a corresponding voltage; an error amplifier for producing an output signal to maintain constant the deviation of the output from the frequency-to-voltage converter from a voltage indicating the resonance frequency; a tip-sample distance control means for controlling the distance between the tip and the sample according to the output signal from the error amplifier; a second vibration application means for producing a reference signal consisting of an AC signal of a given frequency; a first frequency detection means for detecting signal components of the same frequency as the reference signal produced from the second vibration application means from the output from the frequency-to-voltage converter and producing an output signal indicating the detected frequency components; a second error amplifier for producing a DC voltage to make zero the output signal from the first frequency detection means; and an accumulator means for producing the sum of the AC voltage of the reference signal from the second application means and the DC voltage from the second error amplifier and applying the sum signal across the tip and the sample. A topographic image of the sample surface is created from the output signal from the error amplifier. A surface potential image of the sample is created from the output signal from the second error amplifier.

The invention also provides a scanning probe microscope comprising: a probe tip disposed opposite to a sample to be investigated; a first vibration application means for supporting and vibrating the tip, the first vibration application means and the probe tip constituting a vibration system; a vibration-activating means for causing the first vibration application means to vibrate the vibration system at or near resonance frequency of the vibration system; a frequency-to-voltage converter for converting a change in the vibrational frequency of the tip into a corresponding voltage; a second vibration application means for producing a reference signal consisting of an AC voltage of a given frequency; a first frequency detection means for detecting signal components of the same period as the given frequency of the reference signal produced from the second vibration application means from the output from the frequency-to-voltage converter and producing an output signal representative of the detected components; a second frequency detection means for detecting frequency components of a period twice the given frequency of the reference signal produced from the second vibration application means; a first error amplifier for producing an output signal to maintain constant the deviation of an input signal from the resonance frequency; a selector means for selectively connecting the first error amplifier with the frequency-to-voltage converter and the second frequency detection means; a second error amplifier for producing a DC voltage to make zero the output from the first frequency detection means; an accumulator means for producing the sum of the AC voltage of the reference signal from the second vibration application means and the DC voltage from the second error amplifier and applying the sum signal across the tip and the sample; and a tip-sample distance control means for controlling the distance between the tip and the sample according to the output signal from the first error amplifier. A topographic image of the sample surface is created from the output signal from the first error amplifier. A surface potential image of the sample is created from the output signal from the second error amplifier.

In another feature of the invention, the aforementioned first vibration application means comprises a cantilever holding the tip at its front end, a piezoelectric device held at the rear end of the cantilever and acting to vibrate the cantilever, and a detector for detecting deflections of the cantilever and producing an output signal representative of the detected deflections. The piezoelectric device vibrates the cantilever at its resonance frequency. The above-described frequency-to-voltage converter converts the output frequency from the detector into a voltage.

In a further feature of the invention, there is further provided a second selector means for connecting the first and second frequency detection means with the frequency-to-voltage converter when the spring constant of the cantilever is large and with the detector when the spring constant is small. When the spring constant of the cantilever is large, the second selector means couples the output from the frequency-to-voltage converter to the first and second frequency detection means. When the spring constant of the cantilever is small, the second selector means couples the output from the detector to the first and second frequency detection means.

In a yet other feature of the invention, the aforementioned first vibration application means has a quartz oscillator at its front end. This oscillator supports and vibrates the probe tip. The above-described frequency-to-voltage converter converts the vibrational frequency of the quartz oscillator into a voltage.

Other objects and features of the invention will appear in the course of the description thereof, which follows.

DESCRIPTION OF THE PREFERRED EMBODIMENTS

Figure 1:
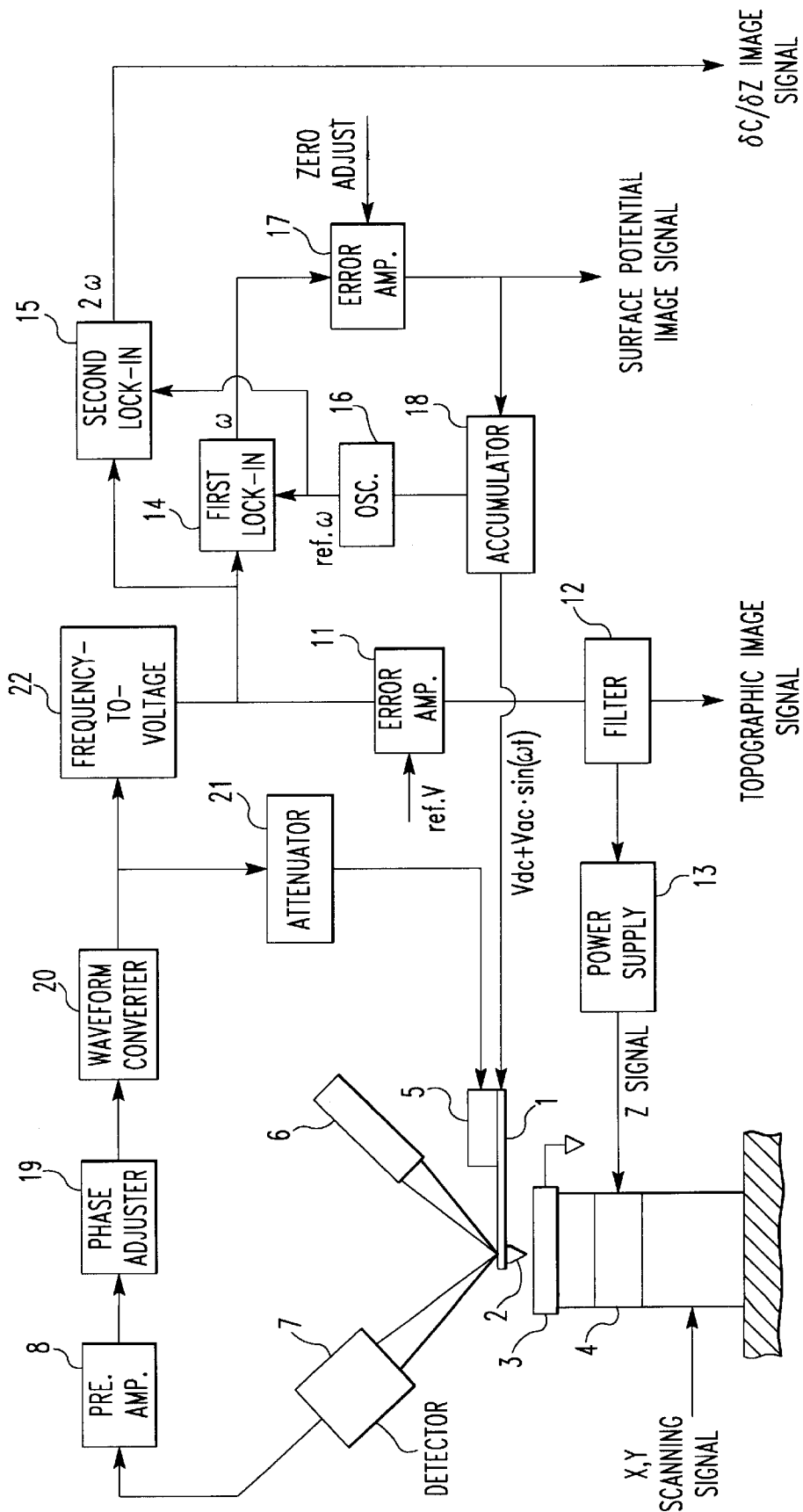
FIG. 1 is schematic diagram of a scanning probe microscope in accordance with the present invention.

Referring to FIG. 1, there is shown a scanning probe microscope in accordance with the invention. This microscope takes the form of an atomic force microscope (AFM). In the known atomic force microscope shown in FIG. 4, there are provided the oscillator 9 and the lock-in amplifier or RMS-DC amplifier 10. In the microscope shown in FIG. 1, the oscillator 9 and the lock-in amplifier or RMS-DC amplifier 10 are omitted. Instead, the output from the preamplifier 8 is applied to a phase adjuster 19. The output from the phase adjuster 19 is applied to a waveform converter 20. The output from the waveform converter 20 is supplied to an attenuator 21 having an amplitude adjuster and to a frequency-to-voltage converter 22.

The output from the attenuator 21 is supplied to the piezoelectric device 5 for applying vibrations while the amplitude of the output is adjusted. The output from the frequency-to-voltage converter 22 is fed to the error amplifier 11 and to the first and second lock-in amplifiers 14, 15.

A vibration application means comprises the cantilever 1, the piezoelectric device 5 and the detector 7. The vibration application means and the probe tip 2 constitute a vibration system. The vibration application means vibrates the vibrate system at or near a resonance frequency of the vibration system.

Figure 4:
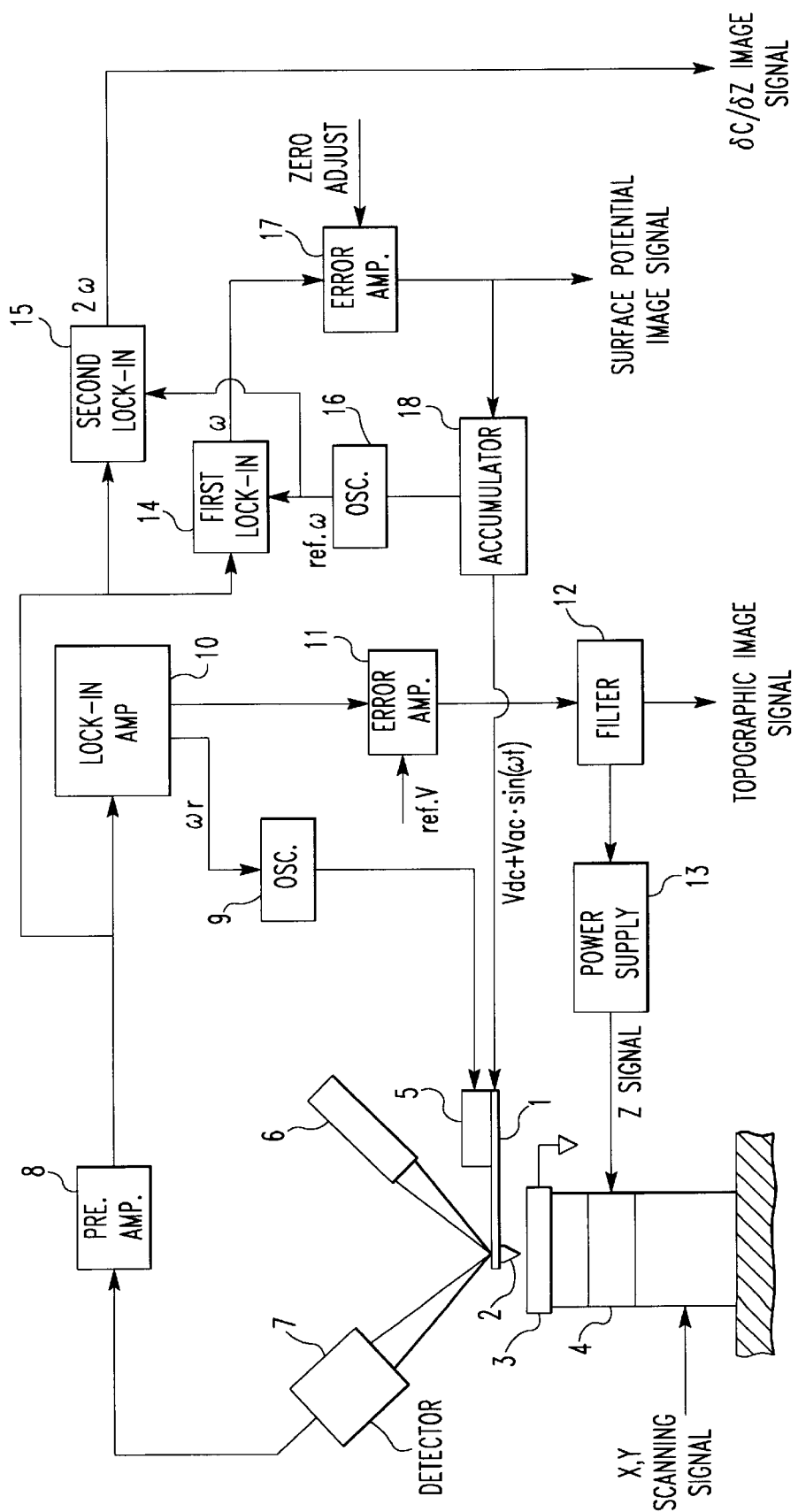
FIG. 4 is a schematic diagram of a known scanning probe microscope using KFM.

This atomic force microscope is similar in structure to the known microscope shown in FIG. 4 in other respects.

In the atomic force microscope constructed in this manner, light from the light source 6 hits the cantilever 1, is reflected by it, and is detected by the light detector 7, in the same way as in the instrument shown in FIG. 4. The output from the light detector 7 is amplified to an appropriate amplitude by the preamplifier 8. The amplitude of the output from the light detector 7 is amplified by the preamplifier 8. The phase of the output from the detector 7 is adjusted by the phase adjuster 19 such that the oscillation system provides a maximum positive feedback to the piezoelectric device 5 for applying vibrations. This oscillation system consists of the piezoelectric device 5, the light detector 7, the preamplifier 8, the phase adjuster 19, the waveform converter 20 and the attenuator 21. Then, the signal is converted into a rectangular wave of a given amplitude, such as power supply voltage, by the waveform converter 20, such as a comparator, to form a reference wave. The gain of the preamplifier 8 is so adjusted that this reference wave is unaffected by unexpected variations in the amplitude of the cantilever 1.

The attenuator 21 sets the amplitude of the voltage applied to the piezoelectric device 5, for example, by division of the reference wave by resistors, so that the vibrating cantilever 1 assumes an appropriate magnitude. The oscillation system constructed as described thus far causes the cantilever 1 to vibrate at its resonance frequency such that the amplitude of vibration is kept constant.

The variations in the frequency of the reference wave from the waveform converter 20 are converted into corresponding voltages by the frequency-to-voltage converter 22. The output from this converter 22 is supplied to the error amplifier 11 and fed back to the piezoelectric scanning device 4 via the filter 12 and the z-motion piezoelectric drive power supply 13 in such a way that the deviation from the given voltage set according to the reference voltage V, or the resonance frequency, is kept constant in the same way as in the AFM shown in FIG. 4. Thus, z-motion of the piezoelectric device 4 is produced. The filter 12 regulates this feedback loop. A topographic image of the sample 3 is created from the output.

The portion for producing this topographic image is the noncontacting atomic force microscope using FM detection. The output from the preamplifier 8 creates the force F between the probe tip 2 and sample 3 by cantilever deflection. The output from the frequency-to-voltage converter 22 creates a force gradient between the probe tip 2 and sample 3, or frequency shift F'. The output signal from the converter 22 is fed to the first and second lock-in amplifiers 14 and 15, respectively. In the same way as in the atomic force microscope shown in FIG. 4, the error amplifier 17 produces the DC voltage Vdc to make zero the ω component detected by the first lock-in amplifier 14. This DC voltage Vdc is fed back to the cantilever 1 via the accumulator 18. The surface potential of the sample 3 and the potential at the front end of the tip 2 are maintained at the same potential. The DC voltage Vdc becomes the surface potential of the sample 3. According to the 2ω-component signal detected by the second lock-in amplifier 15, an image representing information about the capacitance between the tip 2 and the sample 3 is displayed on the display unit together with the surface potential.

In this way, in the present embodiment, the force gradient F' acting on the cantilever 1 is used in the first and second lock-in amplifiers 14 and 15. Therefore, the surface potential can be imaged using the cantilever 1 having a larger spring constant than where the force F acting on the cantilever 1 is used in a conventional manner. This enhances the resolution of the surface potential imaging. Furthermore, the cantilever 1 of a larger spring constant is used and hence the distance between the tip 2 and the sample 3 can be reduced. Consequently, the resolution of the topographic image of the surface of the sample 3 is improved.

Figure 2:
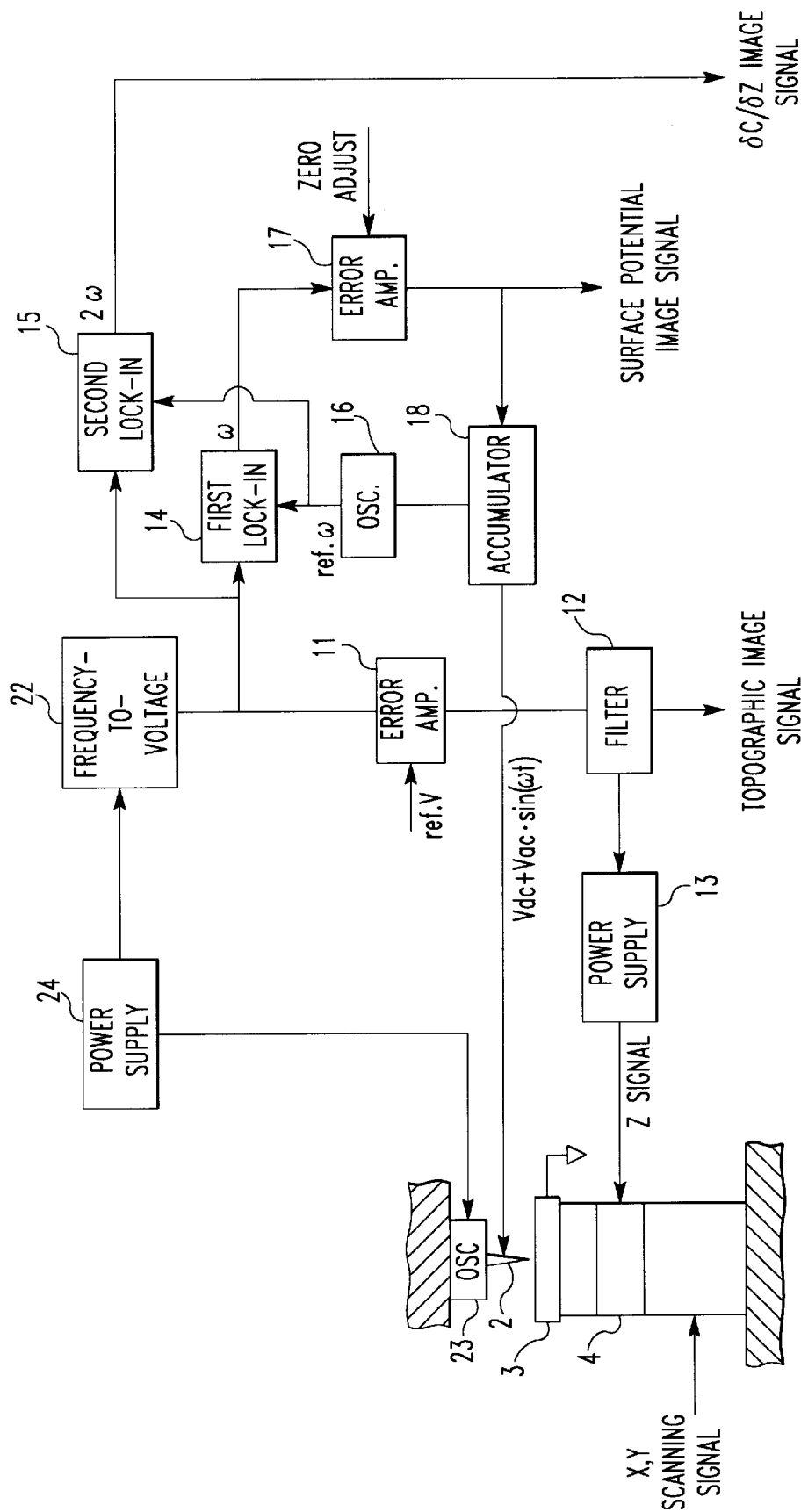
FIG. 2 is a schematic diagram of another scanning probe microscope in accordance with the present invention.

Referring next to FIG. 2, there is shown a further atomic force microscope in accordance with the invention. The atomic force microscope shown in FIG. 1 uses the cantilever 1. The instrument shown in FIG. 2 is a needle-type atomic force microscope in which the cantilever 1 is replaced by a quartz oscillator 23 to which the tip 2 is attached. This atomic force microscope is equipped with none of the piezoelectric device 5 for applying vibrations, the light source 6, the light detector 7, the preamplifier 8, the phase adjuster 19, the waveform converter 20, and the attenuator 21, all of which are incorporated in the instrument shown in FIG. 1.

This quartz oscillator 23 is connected with an oscillator drive power supply 24, which in turn is connected with the frequency-to-voltage converter 22. This instrument is similar to the instrument shown in FIG. 1 in other respects.

In this embodiment, the oscillator drive power supply 24 resonates the quartz oscillator 23 at its resonant frequency. Thus, the tip 2 vibrates at the resonance frequency of the quartz oscillator 23. The force gradient F' on the tip 2 causes a shift of resonant frequency of the quartz oscillator 23. The oscillator drive power supply 24 applies an oscillation waveform undergone this frequency shift to the frequency-to-voltage converter 22. The frequency shift is converted into a voltage by the frequency-to-voltage converter 22 in the same way as the AFM shown in FIG. 1. As a result, a topographic image of the sample 3, a surface potential image of the sample 3 and an image representing information associated with the capacitance between the tip 2 and the sample 3 are obtained.

In this embodiment, the quartz oscillator 23 is used and so it is easy to obtain a resonance frequency higher than that of the cantilever 1. In consequence, the response frequency band of the frequency-to-voltage converter 22 that would normally be an impediment to detection of the force gradient F' is improved. This instrument is similar to the instrument shown in FIG. 1 in other respects.

In the embodiments described above, the FM detection is used by utilizing the noncontacting atomic force microscopy. The present invention can also be applied to the slope detection method.

Figure 3:
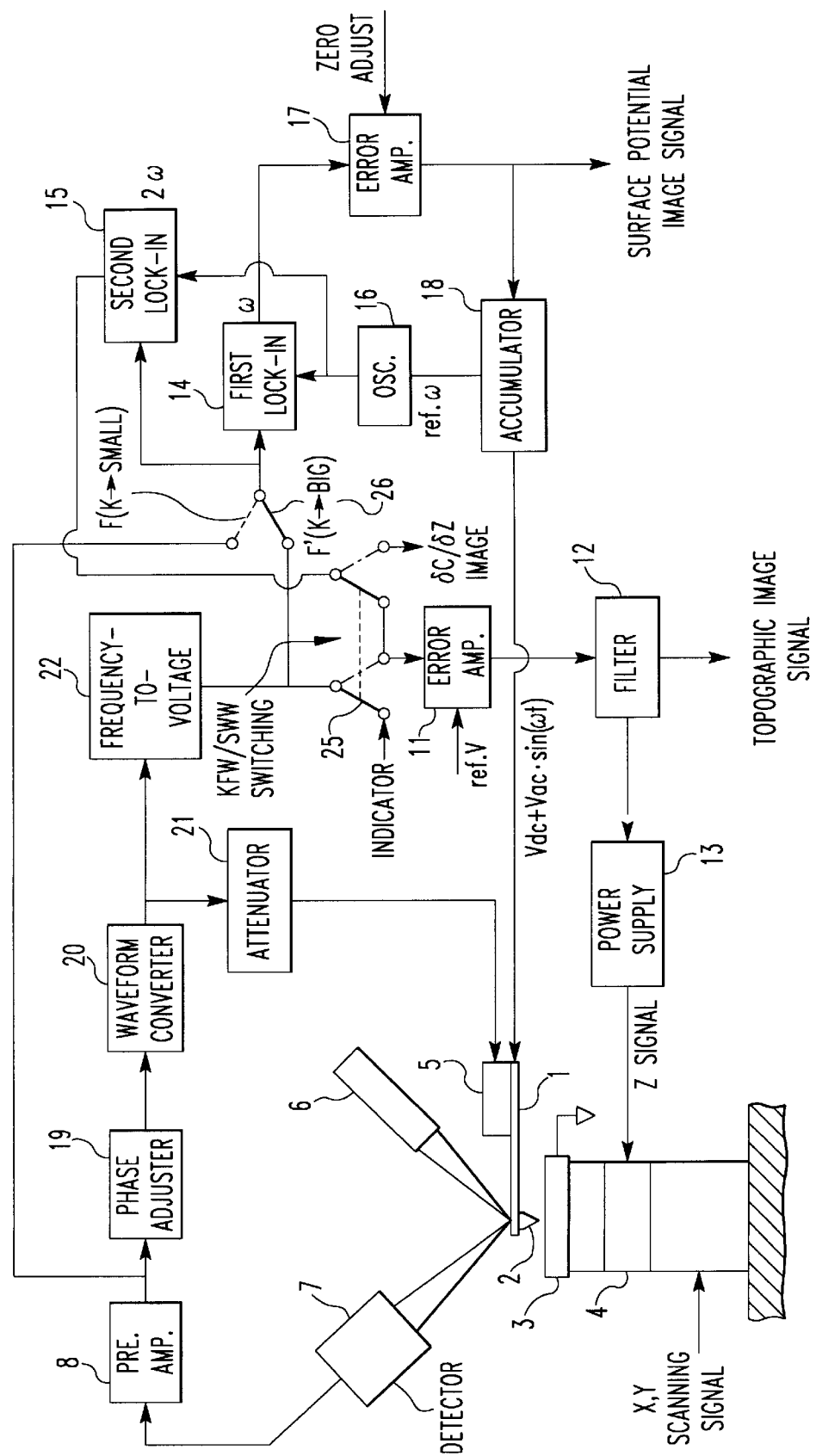
FIG. 3 is a schematic diagram of a further scanning probe microscope in accordance with the present invention.

Referring next to FIG. 3, there is shown a further atomic force microscope in accordance with the invention. In the instrument shown in FIG. 1, only Kelvin probe force microscopy (KFM) is employed as a procedure for imaging surface potentials. In this embodiment shown in FIG. 3, both Kelvin probe force microscopy and scanning Maxwell stress microscopy (SMM) are used as a procedure for imaging surface potentials. The instrument shown in FIG. 3 includes a KFM/SMM selector switch 25 and a switch 26 for switching the spring constant of the cantilever 1.

The KFM/SMM selector switch 25 is switched to the position indicated by the broken line when the surface potential of the sample 3 is imaged by KFM. The switch 25 is switched to the position indicated by the solid line when the surface potential is imaged by SMM.

If the spring constant k of the cantilever 1 is large and the surface potential of the sample 3 is imaged with the force gradient F' between the probe tip 2 and sample 3, the spring constant selector switch 26 is switched to the position indicated by the solid line. If the spring constant k of the cantilever 1 is small and the surface potential of the sample 3 is imaged with the force F between the probe tip 2 and sample 3, the switch 26 is switched to the position indicated by the broken line. This instrument is similar to the instrument shown in FIG. 1 in other respects.

In this embodiment, when a topographic image of the surface of the sample 3 and a surface potential image are generated by KFM with the cantilever 1 of a large spring constant, the KFM/SMM selector switch 25 is switched to the position indicated by the broken line, and the spring constant selector switch 26 is switched to the position indicated by the solid line. The output from the frequency-to-voltage converter 22 is applied to the error amplifier 11 via the KFM/SMM selector switch 25 and to the first and second lock-in amplifiers 14, 15 via the spring constant selector switch 26. This state is exactly the same as the state of the atomic force microscope shown in FIG. 1. Under this state, this microscope operates in exactly the same way as the microscope shown in FIG. 1.

Where the topography of the sample 3 and the surface potential are imaged using the cantilever 1 of a small spring constant k by the KFM method, the KFM/SMM selector switch 25 and the spring constant selector switch 26 are switched to the positions indicated by the broken lines. The output from the frequency-to-voltage converter 22 is applied to the error amplifier 11 via the KFM/SMM selector switch 25. The output from the preamplifier 8 is applied to the first and second lock-in amplifiers 14, 15 via the spring constant selector switch 26. Under this condition, the oscillation system operates similarly to the oscillation system of the instrument shown in FIG. 1. The topography of the sample 3 is imaged in the same manner as in the instrument shown in FIG. 1. The z-motion drive power supply 13 provides feedback control of the piezoelectric scanning device 4 to maintain constant the distance between the tip 2 and the sample 3 in the same manner as in FIG. 1. In addition, the surface potential is imaged in the same manner as in the known atomic force microscope shown in FIG. 4. Information about the capacitance between the tip 2 and the sample 3 is obtained similarly to the known instrument shown in FIG. 4. Feedback of the voltage to the tip 2 is provided in the same way as in FIG. 4.

Where a topographic image of the sample 3 is generated by a scanning Maxwell stress microscopy (SMM) method using the cantilever 1 having a large spring constant k, the KFM/SMM selector switch 25 is switched to the position for the KFM method indicated by the broken line to move the tip 2 toward the sample 3. At the same time, the spring constant selector switch 26 is switched to the position indicated by the solid line. Then, the tip 2 is moved toward the sample 3 in the same way as in the conventional noncontact atomic force microscopy. After the completion of the movement of the tip 2, an amount of frequency shift is measured by the KFM method in the same manner as in the noncontact atomic force microscopy. The output from the frequency-to-voltage converter 22 is stored in memory. Subsequently, the sample 3 is moved away from the tip 2 by the z-motion piezoelectric drive power supply 13, and the KFM/SMM selector switch 25 is switched to the position for SMM indicated by the solid line. Then, the value of the reference voltage V of the error amplifier 11 indicative of the distance between the tip 2 and the sample 3 is reset based on the output from the frequency-to-voltage converter 22 stored in memory. When the KFM/SMM selector switch 25 is switched to the position for SMM indicated by the solid line, the output from the frequency-to-voltage converter 22 is applied to the first and second lock-in amplifiers 14, 15 via the spring constant selector switch 26. Also, the output from the second lock-in amplifier 15 indicative of the 2ω component is applied to the error amplifier 11. Under this condition, a topographic image is generated and the surface potential is imaged by the SMM method by noncontact atomic force microscopy. In this case, the error amplifier 11 produces an output signal to maintain constant the deviation from the resonance frequency in the same way as the foregoing according to the output from the second lock-in amplifier indicative of the 2ω component and according to the reset reference voltage V. The output signal is sent to the z-motion piezoelectric drive power supply 13 via the filter 12. This power supply 13 provides feedback control of the piezoelectric scanning device 4 to maintain constant the distance between the tip 2 and the sample 3. At this time, a topographic image of the surface of the sample is created from the output from the filter 12. Since the output from the frequency-to-voltage converter 22 is supplied to the first and second lock-in amplifiers 14, 15, the surface potential is imaged in the same way as in the atomic force microscopy shown in FIG. 1 using the KFM method.

Furthermore, when the topography of the surface of the sample 3 is portrayed and a surface potential image is produced using the cantilever 1 having a small spring constant k by the SMM method, the KFM/SMM selector switch 25 is switched to the position for KFM indicated by the broken line and the spring constant selector switch 26 is switched to the position indicated by the broken line in order to move the tip 2 toward the sample 3. Then, the reference voltage V to the error amplifier 11 is reset and the switch 25 is switched to the position for SMM indicated by the solid line in the same way as in the aforementioned SMM.

Figure 5:
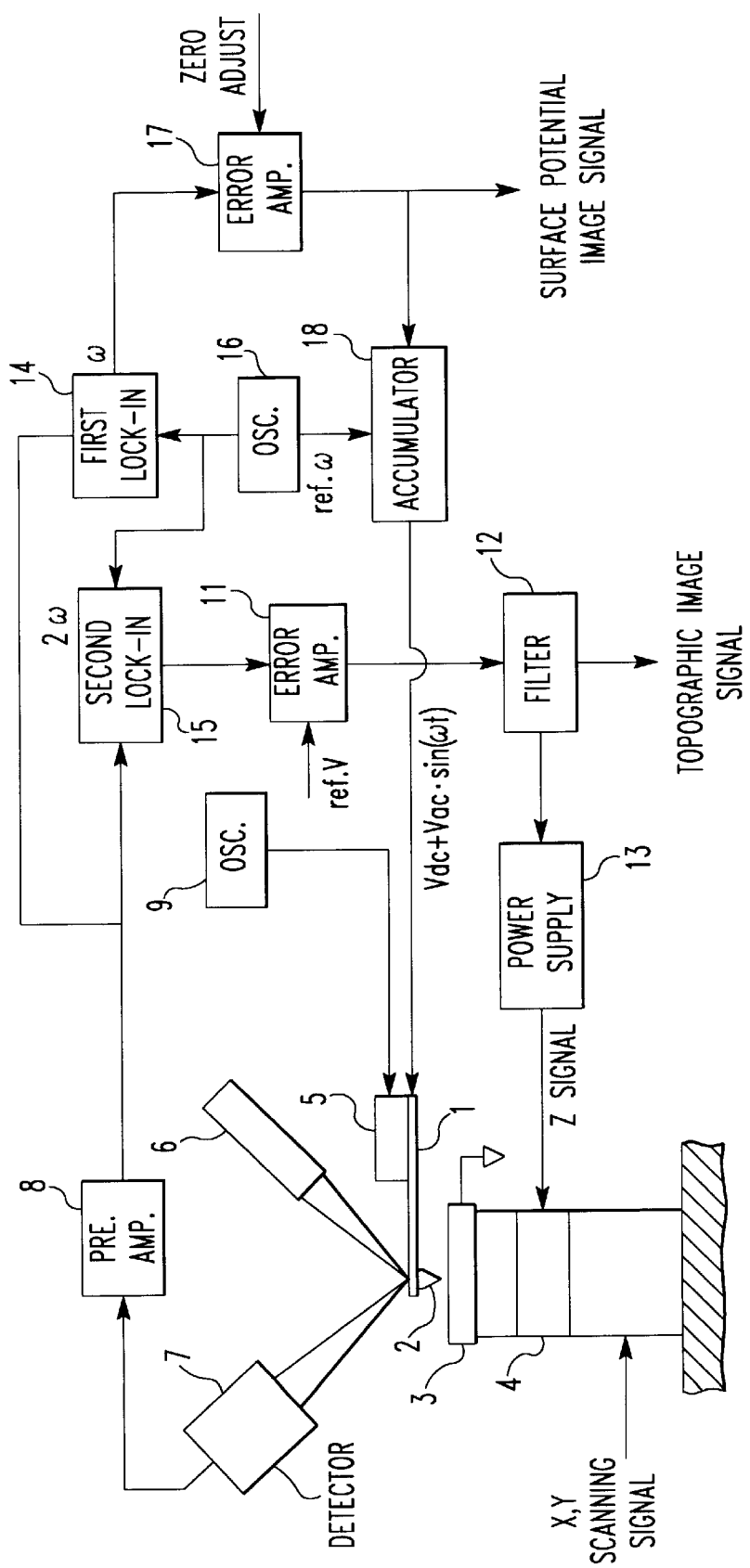
FIG. 5 is a schematic diagram of another known scanning probe microscope using SMM.

Under this condition, a topographic image of the surface of the sample 3 is generated and the surface potential is imaged. The surface potential imaging is carried out in the same way as in the above-described imaging using scanning Maxwell stress microscopy (SMM). In addition, the surface potential is imaged in the same way as in the imaging procedure shown in FIG. 5 using SMM by the conventional noncontact atomic force microscopy.

The various atomic force microscopes using the aforementioned cantilever make use of an optical lever. It is to be understood that the invention is not limited to this method. Other methods using optical interference or electrostatic capacitance may also be used.

As can be understood from the description provided thus far, in a scanning probe microscope according to this invention, the surface potential of a sample is detected using a force gradient that is represented by the output from the frequency-to-voltage converter. Therefore, if a cantilever having a large spring constant or a needle-type scanning probe microscope having a high resonance frequency is used, a surface potential image is obtained at a high resolution. The use of a cantilever having a large spring constant or a needle-type scanning probe microscope having a high resonance frequency improves the resolution of the topographic image of the sample surface up to an atomic level when the topographic image is produced simultaneously with a surface potential image.

In a scanning probe microscope according to this invention, when imaging is performed by SMM, the first error amplifier is first connected with the frequency-to-voltage converter by the selector means. The distance between the tip and the sample is set by KFM. Then, the selector means connects the first error amplifier to the second frequency detection means. Then, for imaging by SMM, the distance between the tip and the sample is determined from the tip-sample distance established by the KFM method. Therefore, during imaging by the SMM method, the distance between the tip and the sample can be easily set to a maximum value without creating the danger of the tip colliding against the sample, in which case the tip would be crushed. Furthermore, the selector means can easily switch the mode of operation between imaging by KFM and imaging by SMM.

In a scanning probe microscope according to an embodiment of the this invention wherein the piezoelectric device vibrates a cantilever at its resonant frequency, a surface potential image and a topographic image of the sample are generated, using a force gradient between the probe tip and sample. Therefore, if a scanning probe microscope equipped with a cantilever of a large spring constant is used, surface potential images and topographic images of the sample are produced at improved resolutions.

Especially, in the scanning probe microscope according to an embodiment of this invention having a selector switch, the mode of operation is switched according to the spring constant of the cantilever. In particular, where this spring constant is small, surface potential imaging and generation of a topographic image are enabled by the use of the force of the cantilever. Where the spring constant is large, surface potential imaging and generation of a topographic image are permitted through the use of a force gradient between the probe tip and sample. The second selector means can easily switch the used force between the force and the force gradient between the probe tip and sample.

In the scanning probe microscope according to an embodiment of this invention wherein a topographic image of a sample surface is produced and the surface potential is imaged using a quartz oscillator, the use of the quartz oscillator facilitates obtaining a resonance frequency higher than that of the cantilever. In consequence, the response frequency band of the frequency-to-voltage converter that would normally be an impediment to detection of the force gradient is improved.

Having thus described our invention with the detail and particularity required by the Patent Laws, what is desired protected by Letters Patent is set forth in the following claims.

What is claimed is:

1. A scanning probe microscope comprising:
   a probe tip disposed opposite to a sample to be investigated;
   a first vibration application means for supporting and vibrating said tip, said first vibration application means and said probe tip constituting a vibration system;
   a vibration-activating means for causing said first vibration application means to vibrate said vibration system at or near resonance frequency of said vibration system;
   a frequency-to-voltage converter for converting a change in the vibrational frequency of said tip into a corresponding voltage and producing an output signal indicative of said converted voltage;
   a first error amplifier for producing an output signal to maintain constant the deviation of the output signal from said frequency-to-voltage converter from a voltage indicative of said resonance frequency;
   a tip-sample distance control means for controlling the distance between said tip and said sample according to the output signal from said first error amplifier;
   a second vibration application means for producing a reference signal consisting of an AC signal of a given frequency;
   a first frequency detection means for detecting components of the same frequency as the reference signal produced from said second vibration application means from the output signal from said frequency-to-voltage converter and producing an output signal indicative of the detected components;
   a second error amplifier for producing a DC voltage to make zero the output signal from said first frequency detection means; and
   an accumulator means for producing the sum of the AC voltage of the reference signal from said second vibration application means and the DC voltage from said second error amplifier and applying the sum signal across said tip and said sample, whereby a topographic image of a surface of said sample is produced from the output signal from said first error amplifier and a surface potential image of said sample is produced from the output signal from said second error amplifier.

2. A scanning probe microscope comprising:
   a probe tip disposed opposite to a sample to be investigated;
   a first vibration application means for supporting and vibrating said tip, said first vibration application means and said probe tip constituting a vibration system;
   a vibration-activating means for causing said first vibration application means to vibrate said vibration system at or near resonance frequency of said vibration system;
   a frequency-to-voltage converter for converting a change in the vibrational frequency of said tip into a corresponding voltage and producing an output signal indicative of said converted voltage;
   a second vibration application means for producing a reference signal consisting of an AC voltage of a given frequency;
   a first frequency detection means for detecting frequency components of the same period as the given frequency of said reference signal produced from said second vibration application means from the output signal from said frequency-to-voltage converter and producing an output signal indicative of the detected components;
   a second frequency detection means for detecting frequency components of a period twice the given frequency of the reference signal produced from said second vibration application means from the output signal from said frequency-to-voltage converter;
   a first error amplifier for producing an output signal to maintain constant the deviation of an input signal from said resonance frequency and producing an output signal indicative of said deviation;
   a selector means for selectively connecting said first error amplifier with said frequency-to-voltage converter and said second frequency detection means;
   a second error amplifier for producing a DC voltage to make zero the output from said first frequency detection means;
   an accumulator means for producing the sum of the AC voltage of the reference signal from said second vibration application means and the DC voltage from said second error amplifier and applying the sum signal across said tip and said sample; and
   a tip-sample distance control means for controlling the distance between said tip and said sample according to the output signal from said first error amplifier, whereby a topographic image of a surface of said sample is produced from the output signal from said first error amplifier and a surface potential image of said sample is produced from the output signal from said second error amplifier.

3. The scanning probe microscope of claim 1 or 2, wherein:
   (A) said first vibration application means comprises a cantilever holding said tip at its front end, a piezoelectric device held at the rear end of said cantilever and acting to vibrate said cantilever, and a detector for detecting deflections of said cantilever and producing an output frequency indicative of the detected deflections;
   (B) said piezoelectric device vibrates said cantilever at its resonance frequency; and
   (C) said frequency-to-voltage converter converts the output frequency from said detector into a voltage.

4. The scanning probe microscope of claim 3, wherein there is further provided a second selector means for connecting said first and second frequency detection means with said frequency-to-voltage converter when the spring constant of said cantilever is large and with said detector when the spring constant is small, and wherein said selector means couples the output signal from said frequency-to-voltage converter to said first and second frequency detection means when the spring constant of said cantilever is large and couples the output signal from said detector to said first and second frequency detection means when the spring constant of said cantilever is small.

5. The scanning probe microscope of claim 1 or 2, wherein:

(A) said first vibration application means has a quartz oscillator at its front end;

(B) said quartz oscillator has a resonance frequency, supports said tip, and vibrates said tip at a vibrational frequency;

(C) said quartz oscillator is vibrated at its resonance frequency; and (D) said frequency-to-voltage converter converts the vibrational frequency of said quartz oscillator into a voltage.

* * * * *